(12) United States Patent
Burton et al.

(10) Patent No.: US 7,287,269 B2
(45) Date of Patent: Oct. 23, 2007

(54) SYSTEM AND METHOD FOR AUTHENTICATING AND CONFIGURING COMPUTING DEVICES

(75) Inventors: David Alan Burton, Vail, AZ (US); Chi-Hsang Chen, Littleton, CO (US); Deven Muir Hubbard, Broomfield, CO (US); Alan Lee Stewart, Boulder, CO (US)

(73) Assignee: International Buiness Machines Corporation, Armonk, NY (US)

( * ) Notice: Subject to any disclaimer, the term of this patent is extended or adjusted under 35 U.S.C. 154(b) by 774 days.

(21) Appl. No.: 10/208,267

(22) Filed: Jul. 29, 2002

(65) Prior Publication Data

US 2007/0226777 A1   Sep. 27, 2007

(51) Int. Cl.
*G06F 17/30* (2006.01)
(52) U.S. Cl. .............................. 726/2; 726/3; 713/168; 713/190; 713/194; 380/28
(58) Field of Classification Search ............ 711/5, 711/114, 103; 726/1, 2, 3; 713/163, 168, 713/170–171, 189, 190, 194; 380/44, 277, 380/281–284, 28
See application file for complete search history.

(56) References Cited

U.S. PATENT DOCUMENTS

| | | | |
|---|---|---|---|
| 6,055,314 A | 4/2000 | Spies et al. | 380/21 |
| 6,295,575 B1 * | 9/2001 | Blumenau et al. | 711/5 |
| 6,493,825 B1 * | 12/2002 | Blumenau et al. | 713/168 |
| 6,883,065 B1 * | 4/2005 | Pittelkow et al. | 711/114 |
| 6,915,437 B2 * | 7/2005 | Swander et al. | 726/1 |
| 7,103,772 B2 * | 9/2006 | Jorgensen et al. | 713/168 |
| 2002/0006196 A1 * | 1/2002 | Shimoyama et al. | 380/44 |

FOREIGN PATENT DOCUMENTS

| | | |
|---|---|---|
| WO | WO98/32065 A2 | 7/1998 |
| WO | WO 00/69120 A1 | 11/2000 |
| WO | WO 01/42952 A2 | 6/2001 |

OTHER PUBLICATIONS

N. Doraswamy and D. Harkins, "IPSec The New Security Standard for the Internet, Intranets, and Virtual Private Networks", Prentice Hall PTR Internet Infrastructure Series, Ch. 3, pp. 41-44 and 51-55.

* cited by examiner

*Primary Examiner*—Kim Vu
*Assistant Examiner*—Baotran N. To
(74) *Attorney, Agent, or Firm*—Kunzler & McKenzie

(57) ABSTRACT

A system and method for authenticating a host on a network enables the host to update IP configuration and internal configuration of a storage controller connected to the network. The host has an algorithm to decrypt a security key supplied by the storage controller. The host broadcasts a discovery command which includes an IP address of the host and a service requested by the host. The discovery command conforms to a proprietary discovery command protocol. In response to the discovery command, the host receives a response from a storage controller which is able to provide the requested service. The response includes a WWN, IP configuration and a security key of the storage controller, and conforms to the discovery command protocol. Next, the host decrypts the security key received from the storage controller using the decryption algorithm, and sends an updated IP configuration to the storage controller along with the security key for authentication. Next, the host exchanges other keys with the storage controller using IKE and IPSec. Afterwards, the host sends an updated internal configuration to the storage controller.

16 Claims, 5 Drawing Sheets

SYSTEM AND METHOD FOR AUTHENTICATING AND CONFIGURING COMPUTING DEVICES

BACKGROUND OF THE INVENTION

The invention relates generally to authentication of computers which access storage controllers and configuration of such storage controllers. The invention deals more particularly with a technique to dynamically authenticate such computers on a network and configures such storage controllers with address information typically required for remote configuration by such computers.

Virtual Private Networks (VPNs) are popular today because they join together multiple private networks without using dedicated network links between the private networks. The VPN environment requires initial authentication between the peers and then Internet Key Exchange (IKE) and IP Security (IPSec) protocols to provide data security between two VPNs. IKE is well known in the industry and allows two security peers to exchange a series of security keys. IKE is described in Request for Comment 2409, which is hereby incorporated by reference as part of the present disclosure. IPSec is an industry standard that allows its peers to encrypt an IP datagram and to authenticate the sender of the datagram. It can be used to encrypt the content of the datagram and/or a destination IP address. Thus, it provides a means to protect the identities of its peers. It typically uses IKE to establish initial set of encryption keys. IPSec is described in RFCs 2401, 2410 and 2411, which are hereby incorporated by reference as part of the present disclosure.

In order to initiate IKE transactions, security peers must first authenticate each other. IKE proposes four different authentication methods: digital signature, two forms of public key and pre-shared key. Digital signature and public key are accessible by the public and are published periodically by the organizations that use them. They are distributed using Public Key Infrastructure which stores digital certificates and signatures. When a receiving peer receives a request to initiate a security key exchange, it validates the given certificate/signature against a trusted database that stores the most recent published certificate. Once the certificate is validated, the receiving peer will continue key exchange process. In a network environment, it is not always possible to have access to a public key infrastructure in which digital signatures or certifications are stored. It is also possible that a chosen IP security tool kit for a device does not provide full-fledged implementation of IKE and IPSec protocol. When either condition occurs, it would be beneficial for the target device to be able to dynamically authenticate the proper host and to establish a secured data path between them.

Unlike digital signature and public key, preshared keys are not widely published but are predetermined among a group of trusted peers. The preshared keys are assigned to each peer in the group and statically associated to specific IP addresses of the respective peers. Many organizations using VPN adopt preshared keys because they only want to communicate with specific VPN peers, and the IP addresses of these other, specific VPN peers are known from the start. However, certain types of target devices such as RAID storage controllers may need to communicate with a large number and wide range of hosts. Also, the hosts may be dynamically added or removed from the network. In such an environment, it is difficult to know, before the communication, the IP address of each host with which each storage controller may need to communicate.

There are two forms of IKE—Main Mode and Aggressive Mode. According to the Main Mode, IKE divides key exchanges into two phases. In phase one, the IKE protocol establishes a security association by exchanging encryption algorithm proposals, a hash algorithm, Diffie-Hellman public values, a method of authentication and auxiliary data. One example of "Diffie Hellman" public values is described in RFC 2631. Once the security association is agreed by the devices and established, all further transactions are protected with the agreed encryption keys for phase two negotiation, that is specific to the actual security service, as follows. In phase two, a set of dynamic security keys is negotiated for a specific security service, in this case the IPSec protocol. These dynamic keys are established based on the security components supported by each peer and are regenerated based on either the amount of data transferred or time elapsed. After the keys are generated, IKE automatically creates inbound and outbound security associations between the two peers based on the security policy defined on each peer. From this point on, all IP datagrams transferred between the two peers are encrypted and/or authenticated by the IPSec protocol. As described so far, security is established at the device level. This means that any application from the physical device such as the secured host computer can send information across an unsecured Ethernet to the target such as the storage controller, and the data cannot be understood or manipulated by any other device. However, this will not prevent a malicious application on the secured host computer from sending a damaging configuration command to the storage controller. Therefore, the security process continues at the application level to prevent unauthorized applications on the secured host computer from establishing a configuration session with the storage controller. The iSCSI protocol is used as the means to transfer configuration commands and responses. As a part of iSCSI login process, the initiator, i.e. proper application on the secured host computer, must supply a login name to be authenticated by the target, i.e. storage controller. This name is predetermined and was agreed by the initiator and the target when a storage system was initially set up. In a typical scenario, each organization will select a unique name shared by all its storage systems. Without the correct name, the target will refuse any unauthorized login request so that the unauthorized iSCSI session cannot be established. The content of the name is protected by IPSec when it is transferred across the network.

The Aggressive Mode of IKE is an alternative to Main Mode during phase one negotiation. The difference between the two modes is mainly in identity protection. IKE's Main Mode separates key exchange information from identity and authentication information. The Aggressive Mode, on the other hand, transfers the key exchange information with the identity information, and thereby exposes the identity information. Furthermore, the Aggressive Mode can only propose one encryption algorithm at a time. The target can either accept or reject the offer. With the Main Mode, the initiator can offer multiple encryption algorithms, and the target can pick and choose one of the proposed algorithms. The benefits of using the Aggressive Mode are speed and support of remote access but the disadvantage is lesser protection of identity.

In both the Main Mode and Aggressive Mode, IPSec allows security peers to authenticate each other and to encrypt data transferred across an unsecured Ethernet using the keys generated from the IKE transactions. There are multiple IPSec protocols including encapsulated Security Payload (ESP) and Authentication Header (AH). AH proves the origin of a data packet and data integrity and prevents replay. ESP provides the same protections of AH plus data confidentiality. Both AH and ESP require cryptography such as DES in CBC mode. IPSec requires shared keys to perform authentication and/or confidentiality; these can be provided by IKE as explained above. There are two modes of IPSec—transport mode and tunnel mode. An original IP packet contains IP header-TCP header-Data, a transport mode contains IP header-IPSec header-TCP header-Data and a tunnel mode contains IP header-IPSec header-IP header-TCP header-Data. The transport mode protects upper layer protocols. An IPSec header is inserted between an IP header and an upper layer protocol header. The transport mode may be used where the communication endpoint is the same as the cryptographic endpoint. The tunnel mode protects entire IP datagrams. A complete IP packet is encapsulated in another IP datagram and an IPSec header is inserted between the outer and inner IP headers. Tunnel mode may be used where the communication destination is also the cryptographic destination, and by security gateways (such as routers and fireballs) to provide security services on behalf of VPN. When tunnel mode is used by the security gateways, the communications endpoints are specified in an inner header that is protected, and the cryptographic endpoints are specified in the outer IP header. A security function in a gateway decapsulates the inner IP packet after IPSec processing and passes the remaining packet to its final destination. IPSec can be implement with a modification of an IP stack to support IPSec natively. A structure called a Security Association (SA) may be used to associated security services and a key with the communications to be protected an the remote peer which exchanges the IPSec communications. Such an association is helpful to encapsulate and decapsulate IPSec packets. Each SA provides security services in one direction only and has parameters called Security Parameter Index which include the IPSec protocol header, a IPSec protocol value and a destination address to which SA applies. Typically, there are parameters for two SAs, one in each direction. (IKE also uses the concept of SA, but has a different format. An IKE SA defines how two peers communicate such as which algorithm to use to encrypt IKE communications and how to authenticate a remote peer. The IKE SA then produces an IPSec SA between the two peers.)

After authenticating a host computer in VPNs or other environments, it may be necessary to configure the target device. Difficulties have arisen in configuring devices which do not have the appropriate network parameters such as (a) an IP address, (b) a subnet mask to indicate which grouping of IP addresses pertains to the device and/or (c) a Gateway address which is needed when the device sends a datagram outside of its own subnet. An existing DHCP protocol dynamically assigns an arbitrary IP address to a target device on a local subnet, when the IP address is lacking. This dynamic assignment is implemented by the following procedure. A host on the local subnet is designated as the DHCP server. All controllers get their IP addresses from this local host. A lease time is assigned to the IP address where the IP address is valid for this lease time. At the end of the lease, a new IP address is generated for the controller. This dynamic assignment becomes the "static" IP address of the target device for the lease time for purpose of configuration and is used by others on other subnets and across the WWW. A problem with this approach is that the IP address changes when the lease runs out. Servers and controllers on a network are generally assigned a static IP address on an IP network for this purpose. If a controller is to be accessed from the WWW, the network address must remain static.

An object of the present invention is to dynamically authenticate hosts and other computing devices and establish a secure link between them and their targets.

Another object of the present invention is to provide such dynamic authentication where digital signature, public key and statically-assigned preshared keys are not available.

Still another object of the present invention is to allow dynamic discovery and configuration of a target device on a network.

SUMMARY OF THE INVENTION

The invention resides in a system, method and program product for authenticating a host on a network to enable the host to update IP configuration and internal configuration of a storage controller connected to the network. The host has an algorithm to decrypt a security key supplied by the storage controller. The host broadcasts a discovery datagram which includes an IP address of the host and a service requested by the host. The discovery command conforms to a proprietary discovery protocol. In response to the discovery command, the host receives a response from a storage controller which is able to provide the requested service. The response includes a WWN, an IP configuration and a security key of the storage controller, and conforms to the discovery protocol. Next, the host decrypts the security key received from the storage controller using the decryption algorithm, and sends an updated IP configuration to the storage controller along with the security key for authentication. Next, the host exchanges other keys with the storage controller using IKE and IPSec. Afterwards, the host sends an updated internal configuration to the storage controller. According to one feature of the present invention, the host's knowledge of the discovery protocol contributes to the authentication of the host.

DETAILED DESCRIPTION OF THE PREFERRED EMBODIMENTS

Figure 1:
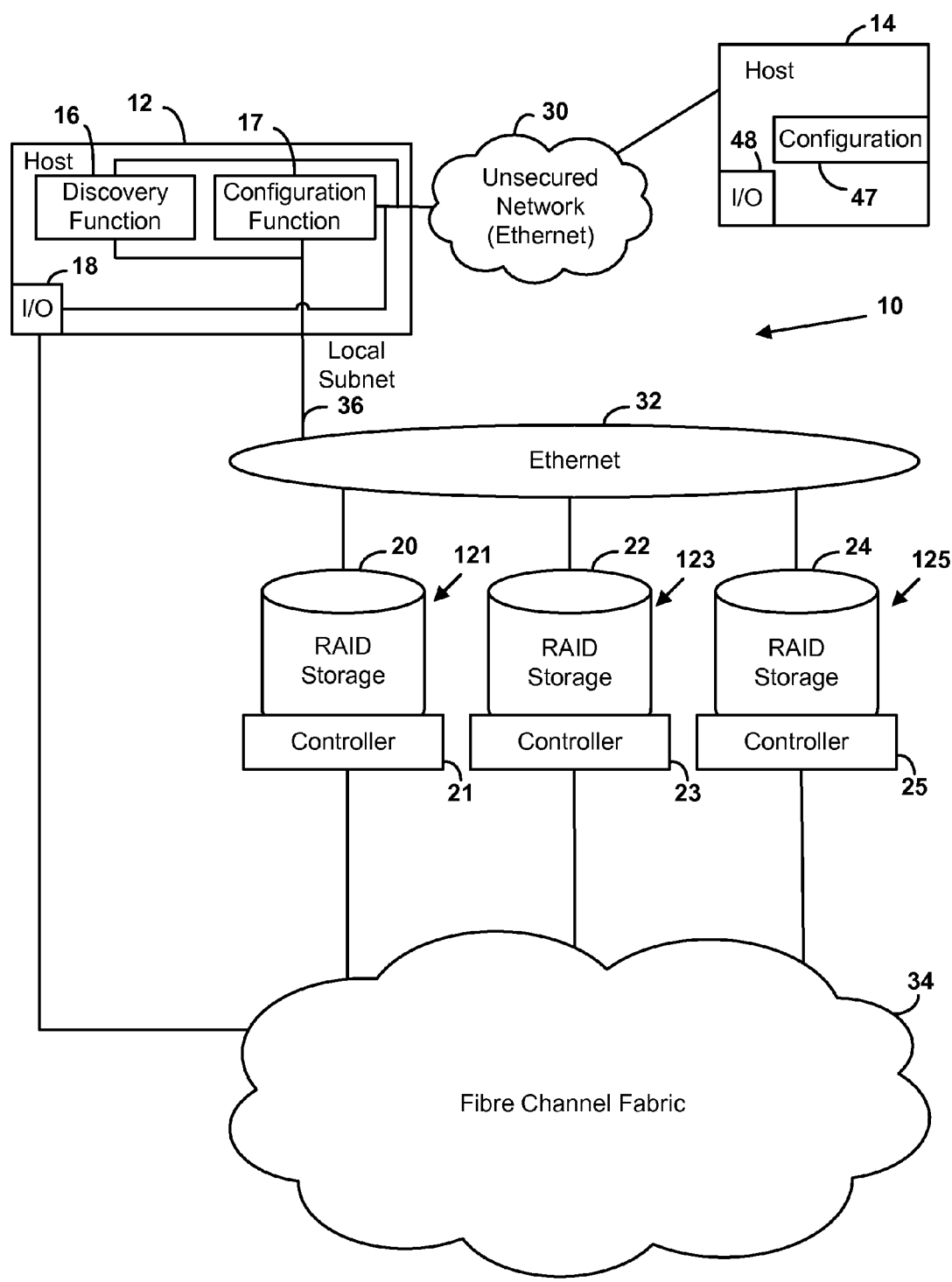
FIG. 1 is block diagram of a network and host computers and target, storage controllers on the network in which a host computer is authenticated and then configures a storage controller according to the present invention.

Referring now to the drawings in detail, wherein like reference numbers indicate like elements throughout, FIG. 1 illustrates a network configuration generally designated 10 comprising different networks, and host computers 12 and 14 and RAID storage devices 121, 123 and 125 connected to the networks. In the illustrated example, the different networks include an unsecured Ethernet 30, an Ethernet 32 which can be used either in a secured or unsecured manner, a Fibre Channel fabric 34 and a local subnet 36.

RAID storage device 121 comprises a set of disks 20 and a controller 21, RAID storage device 123 comprises a set of disks 22 and a controller 23 and RAID storage device 125 comprises a set of disks 24 and a controller 25. Each storage device includes a Fibre Channel port and an Ethernet port, not shown. The Fibre Channel is used to transfer data while the Ethernet is used for configuration commands.

Host 12 is coupled to the storage devices by two paths. For authentication and configuration communication, host 12 is coupled to the storage devices via local subnet 36 and Ethernet 32. For I/O operations, host 12 is coupled to the storage devices via Fibre Channel Fabric 34. Host 12 is also connected to unsecured Ethernet 30 for communication with devices other than the storage devices. Host 12 includes a discovery program or function 16, an IP address configuration program or function 17, a RAID configuration program or function 38, and an I/O program or function 18 relating to the storage controllers. Host 12 also includes a variety of other programs or functions (not shown) which process data read from or written to the storage devices and communicate with other hosts. Host 12 is a "friendly" host which is attached to the Fibre Channel fabric to validly exchange data with one or more of the storage devices. Discovery function 16 is used to authenticate host computer 12 to the storage controller(s) it wishes to configure. IP address configuration function 17 may be needed to configure/set the IP address of the storage device(s) to permit communication from the host computer 12, if the IP address is not currently known by the host computer 12. After the IP address is known, RAID configuration function 38 can be used to perform a variety of substantive, internal configuration functions. For example, RAID configuration function 38 can configure the storage devices as to RAID "level" i.e. degree of data redundancy, parity, distribution of data across different storage mediums, etc. Multiple RAID levels are currently known such as RAID levels one, three and five. The configuration function can also configure the storage devices as to disk size, cache type (for example, write through vs. write back), and host mapping. The configuration function can also perform maintenance operations on the storage devices such as disk rebuild, initialization and expansion and monitor operational status of the storage controllers.

Host computer 14 represents one or many potentially "hostile" hosts which are attached to Ethernet 30. Ethernet 30 is connected to Ethernet 32 so that host 14 is coupled to the storage devices. Because host 14 is potentially hostile, host 14 should not be authenticated by the storage devices or permitted to configure or access the storage devices. Therefore, host 14 does not include a discovery function according to the present invention and does not have a security key to establish a connection with the storage devices. However, host 14 includes a configuration program or function 47 and an I/O program or function 48 which are capable of operating upon the storage devices if host 14 is authenticated for these purposes. Host 14 also includes a variety of other programs or functions (not shown) which process data and communicate with other hosts.

Figure 2:
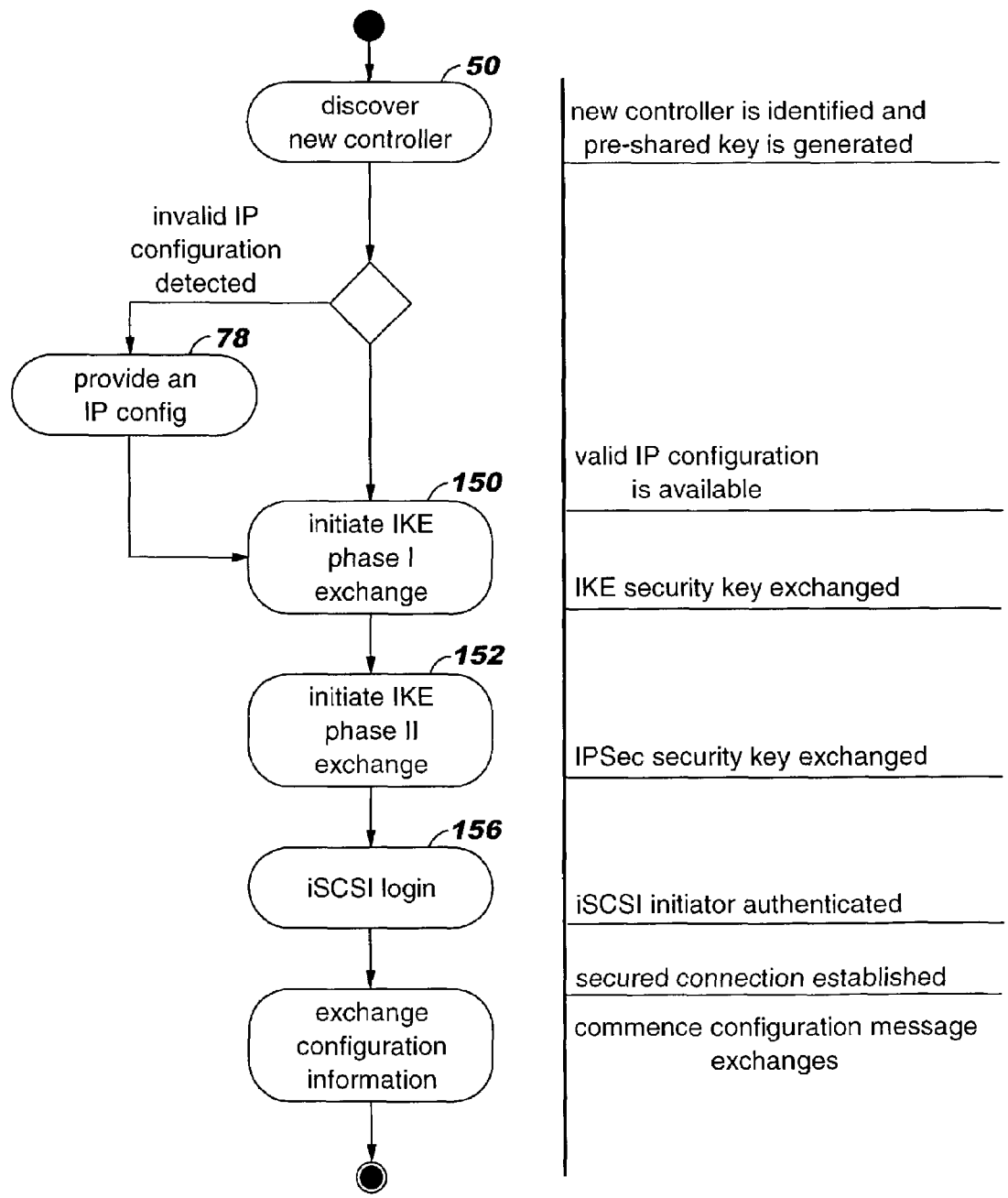
FIG. 2 is a flow chart illustrating the dynamic authentication process and configuration process of the present invention, which authentication process and configuration process are implemented by a host computer and storage controller of FIG. 1.
Figure 3A:
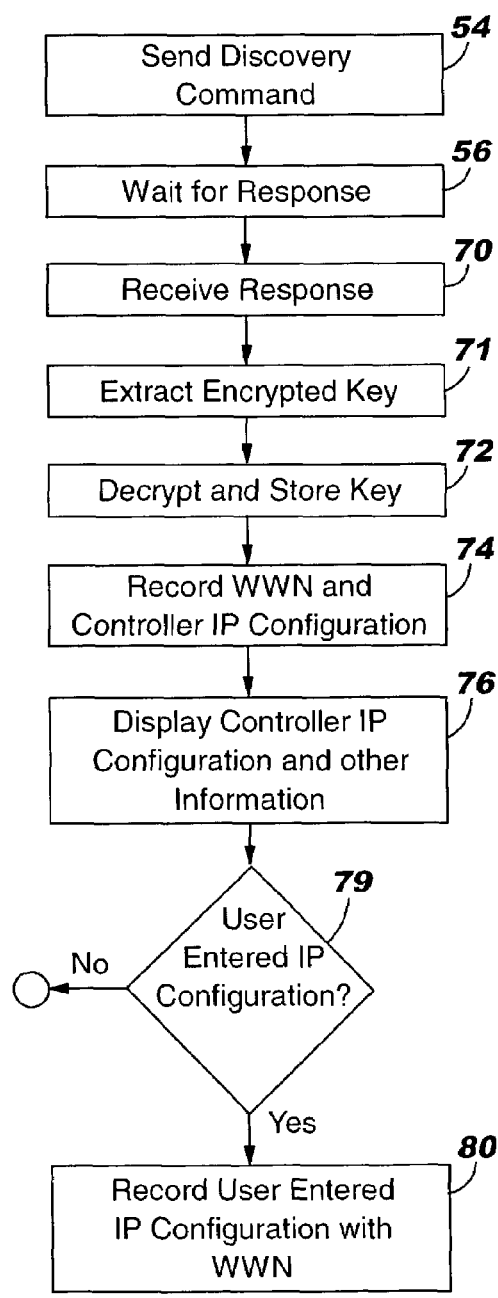
FIGS. 3(a) and 3(b) form a more detailed flow chart of the dynamic authentication process of FIG. 2.
Figure 3B:
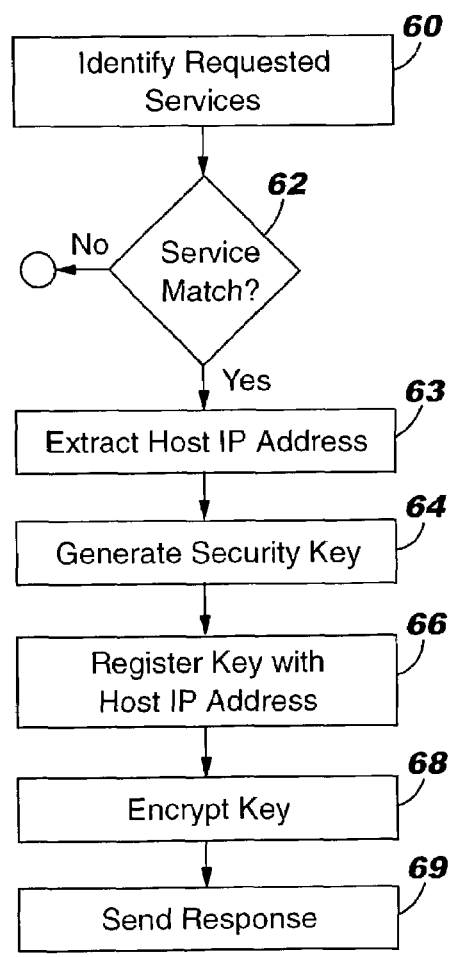

FIG. 2 illustrates how host 12 can establish a secured connection with any of the storage controllers 21, 23 or 25 and then configure the storage controllers. The authentication process begins with Step 50 which is the discovery function. This discover function is further illustrated in FIGS. 3(a) and 3(b) and conforms to a proprietary protocol. A "proprietary protocol" usually originates from a company and is shared with customers, business partners and other companies that make products that interpellate with those of the originating company. Typically, all of the storage controllers that could potentially establish a secured connection with host 12 according to the present invention, are listening for either a "discovery" command or a "configuration" command. Upon request by a user at the host 12, the discovery function 16 issues a discovery command on local subnet 36 to identify all storage controllers on the subnet (step 54). (Typically, the user will know when a new storage device has been connected to the network, and this will be the impetus for him or her to request the discovery process.) The discovery command includes one or more service requests such as to provide iSCSI service (to pass SCSI commands), FTP service (to transfer/download files) or Telnet service (for remote sessions). The discovery command also includes the IP address of the host 12. (Thus, at any time prior to sending the discovery command, the host can dynamically change its IP address for security reasons.) The discovery function 16 then listens for "identification" responses (step 56). When each storage controller receives the discovery command, it determines if it can provide the service(s) requested by the discovery function 16 (step 60 and decision 62). Each storage controller knows what service(s) it can provide. If the storage controller cannot provide all the requested services, it does not respond. However, if the storage controller can provide all the requested services, it extracts the host 12 IP address from the discovery command (step 63) and generates a key (step 64). As explained below, the host 12 will use the key to initiate a series of key exchanges that result in separate keys used to authenticate subsequent configuration commands sent to the storage controller 21. To simplify the explanation of the present invention, assume that only storage device 121 can provide all the requested services and continues as follows. The key is generated in either of two ways. It can be generated by a pseudo-random number generator within the device 121 (not shown) or assigned and entered by a user at the device 121. (The host 12 will not know the key until it is sent by the storage controller 21.) Then, the storage controller 21 registers the key in association with the host 12 IP address (step 66). Next, the storage controller encrypts the key (step 68) for transmission. Finally, the storage controller 21 sends to host 12 an "identification" response which includes a World Wide Name ("WWN"), storage controller IP configuration (if one exists for the storage controller) and the key of the storage controller 21. The "IP configuration" (if existing) comprises the IP address, subnet mask and gateway address of the storage controller. If there is no IP configuration, the storage controller returns a series of zeros as place holders. The host 12 deems a storage controller with no IP configuration as "partially discovered", because other meaningful information is received. The host 12 deems a storage controller that has a complete, valid IP configuration as "fully discovered".

Upon receipt of each identification response (which in the illustrated example is from one storage controller) (step 70), the discovery function 16 makes a record that the respective storage device is either partially discovered or fully discovered. The discovery function 16 then extracts the encrypted key (step 71), decrypts and stores the key (step 72) and records the WWN and IP configuration (if existing) of the storage controller (step 74). It should be noted that the host 12 did not have or need the storage controller key before it received it in step 70 from the storage controller. However, host 12 previously obtained the decryption algorithm for the key. The decryption algorithm was previously programmed into the discovery function or subsequently entered by a systems administrator of the host. The encryption/decryption algorithm can either be a proprietary algorithm or a public algorithm such as Triple DES (Data Encryption Standard) or MARS. The advantage of this arrangement is that the storage controller can dynamically change its key if it suspects that an unfriendly host has obtained it, and this will not confound host 12. Finally, the discovery function displays the storage controller IP configuration, WWN and other information for the user at host 12 (step 76). The storage controller IP configuration can either be a series of zeros or a potentially valid IP configuration. The user reviews this information to determine if the controller IP configuration seems valid. If it is the series of zeros or some other IP configuration that the user knows is invalid, the user enters into the host a valid storage controller IP configuration based on the user's knowledge of the storage controller's configuration (step 78 of FIG. 2). This user-entered, storage controller IP configuration is then recorded at the host 12 with the WWN for the storage controller in place of the invalid storage controller IP configuration received from the storage controller (step 80 of FIG. 3(*a*)). In the illustrated example, assume storage controller 21 responded in step 69 with an invalid IP configuration.

It should be noted that the foregoing discovery process serves to "authenticate" the host 12 in two ways. First, the host must know the predetermined, "proprietary" discovery protocol for the authentication process. This protocol includes headers, information fields, a sequence of the fields in the messages, a sequence of messages, etc. that is not well known. The form of the protocol is not critical to the present invention, provided the host and the storage controller it wishes to configure know it and that it is not widely known. Second, the host must have known the decryption algorithm to decrypt the key supplied by the storage controller.

Figure 4A:
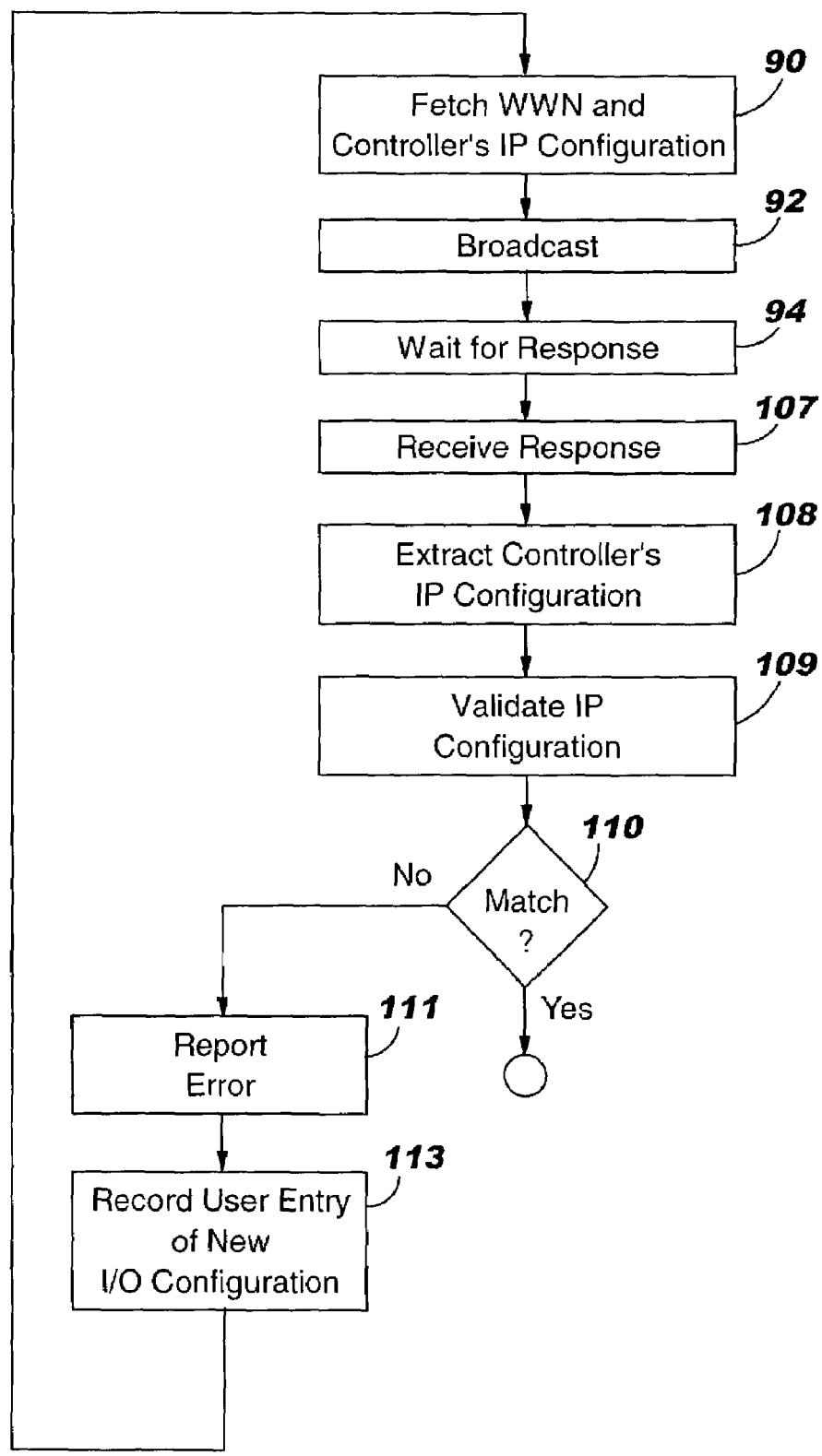
FIGS. 4(a) and 4(b) form a more detailed flow chart of the configuration process of FIG. 2.
Figure 4B:
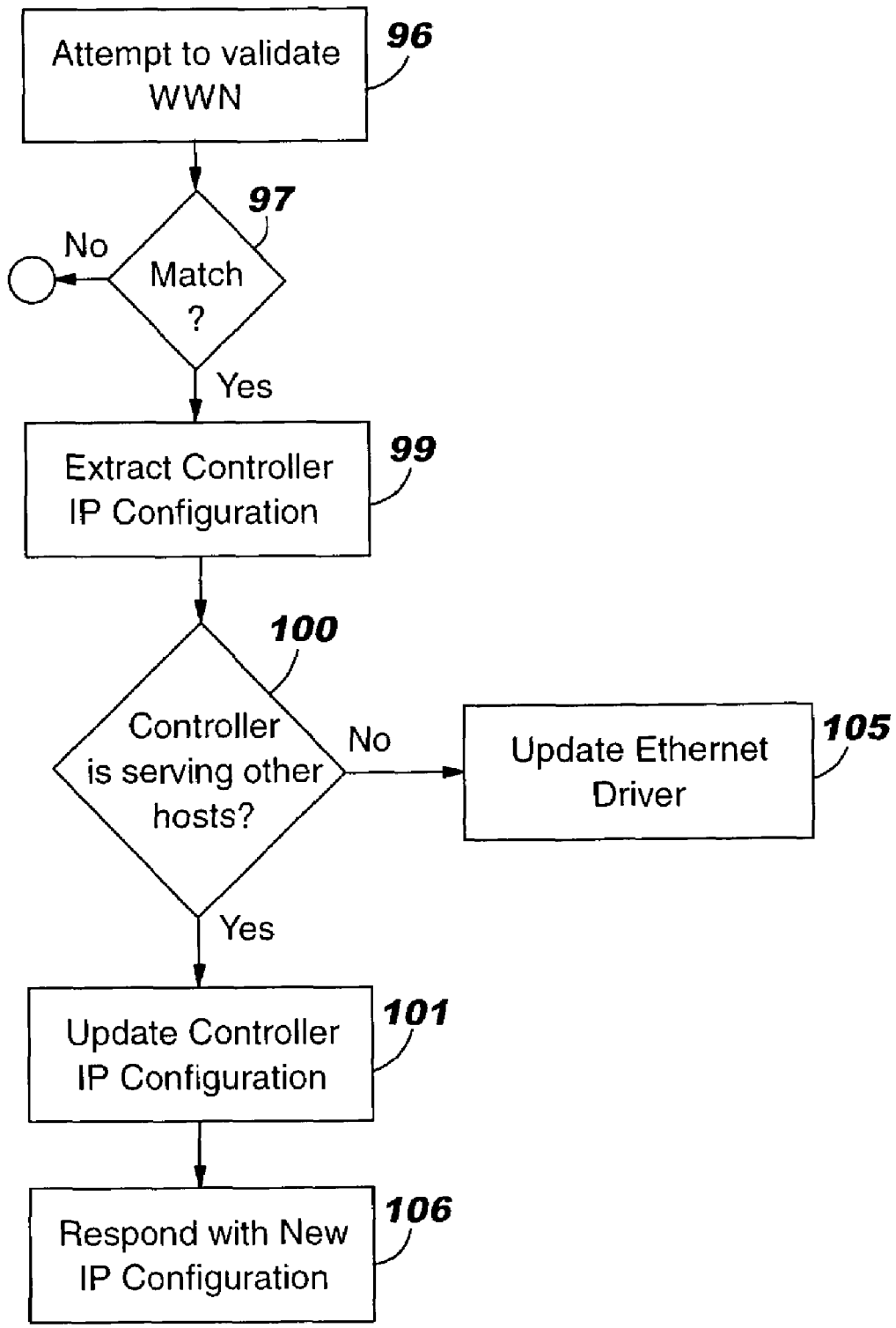

Next, the IP address configuration function 17 fetches (from the record compiled by the discovery function) the WWN and IP configuration for those storage controllers that provided a response to the original discovery command and did not provide a valid IP configuration (step 90 of FIG. 4(*a*)). In such cases, the user supplied one in step 78, and these need to be conveyed to the respective storage controllers. (The configuration function does not attempt to reconfigure any other storage controllers.) Then, the configuration function broadcasts the configuration command on the subnet (step 92). The configuration command includes the WWN of the storage controller that needs to be reconfigured. The configuration function then waits for a response (step 94). The storage controllers on the subnet attempt to validate the WWN (step 96 and decision 97). If the WWN is the not valid for a storage controller that receives the configuration command, it ignores the configuration command. However, the storage controller which has the WWN indicated in the configuration command is the rightful target and extracts the controller IP configuration contained in the configuration command (step 99). At this point a check is made whether the storage controller is currently providing service to a host (decision 100). If not, the IP configuration of the ethernet driver of the storage controller is updated with the IP configuration received from the configuration command (step 101). However, if the storage controller is currently providing service to a host, then it stores the IP address in its non-volatile memory, and later updates its ethernet driver when the storage controller is available to update its configuration information (steps 105 and 101). Finally, the storage controller responds to the configuration function with its WWN and the updated IP configuration, for verification purposes (step 106). The configuration function receives this response and extracts the storage controller's IP configuration (step 108). Next, the configuration function compares the IP configuration just received from the storage controller to the one sent in the configuration command for verification purposes (step 109). If they match, the configuration update was a success. However, if they do not match, the configuration function displays an error to the user (step 111), and the user enters a new IP configuration for the storage controller. In response, the configuration function records the new IP configuration (step 113) and then returns to step 90 to repeat the foregoing configuration process with the newly entered IP configuration for the storage controller.

After the host updates the IP configuration of the storage controller as explained above, RAID configuration function 38 begins the process or making substantive changes to the internal configuration of the storage controller, such as RAID level, storage allocation and maintenance. This process begins with another level of security processing. The configuration function 38 initiates a series of security key exchanges for IKE and IPSec (steps 150 and 152). IKE protocol is used to facilitate exchange of the key provided by the storage controller 21 in step 68 to authenticate host 12. This key is used to initiate IKE. As explained above, there are two forms of IKE—Main Mode and Aggressive Mode. According to the Main Mode, IKE divides key exchanges into two phases. In the initial phase, the IKE protocol establishes a security association by exchanging encryption algorithm proposals, Diffie-Hellman public values and auxiliary data. Once the security association is agreed by the devices and established, all further transactions are protected with a set of negotiated keys used to authenticate the IKE peers. This security association is also used in phase two to establish security association for the actual security service, as follows. A set of dynamic security keys is negotiated for a specific security service, in this case IPSec protocol. These dynamic keys are established based on the security components supported by each peer and are regenerated based on either the amount of data transferred or time elapsed. After the keys are generated, IKE automatically creates inbound and outbound security associations between the two peers based on the security policy defined on each peer. From this point on, all IP datagrams transferred between the two peers are encrypted and/or authenticated by the IPSec protocol. As described so far, security is established at the device level. This means that any application from the physical device such as the secured host computer can send information across an unsecured Ethernet to the target such as the storage controller, and the data cannot be understood or manipulated by any other device. However, this will not prevent a malicious application on the secured host computer from sending a damaging configuration command to the storage controller. Therefore, the security process continues at the application level to prevent unauthorized applications on the secured host computer from establishing a configuration session with the storage controller. The iSCSI protocol is used as the means to transfer configuration commands and responses. As a part of iSCSI login process, the initiator, i.e. proper application on the secured host computer, must supply a login name to be authenticated by the target, i.e. storage controller. This name is predetermined and agreed by the initiator and the target. Without the correct name, the target will refuse any unauthorized login request so that the unauthorized iSCSI session cannot be established. Note that the content of the name is already protected by IPSec when it is transferred across the network.

The Aggressive Mode of IKE is an alternative to Main Mode during phase one negotiation. The difference between the two modes is mainly in identity protection. IKE's Main Mode separates key exchange information from identity and authentication information. The Aggressive Mode, on the other hand, transfers the key exchange information with the identity information, and thereby exposes the identity information. Furthermore, the Aggressive Mode can only propose one encryption algorithm at a time. The target can either accept or reject the offer. With the Main Mode, the initiator can offer multiple encryption algorithms, and the target can pick and choose one of the proposed algorithms. The benefits of using the Aggressive Mode are speed and support of remote access but the disadvantage is lesser protection of identity. In both the Main Mode and Aggressive Mode, IPSec allows security peers to authenticate each other and to encrypt data transferred across an unsecured Ethernet using the keys generated from the IKE transactions.

As explained above, IPSec security keys are used to protect any network messages passed between the RAID configuration function 38 and the storage controller. After the IPSec connection is established, the configuration function issues a login command to the iSCSI service provided by the storage controller. (step 156). The iSCSI controller authenticates host 12 and optionally exchanges a series of operational parameters. The iSCSI service of the storage controller 21 authenticates the host as follows. The configuration function supplies a login name to be authenticated by the storage controller. This login name was predetermined and was previously agreed by the configuration function and the storage controller. For initial configuration, the configuration function will use factory default login name, and this name can be changed as a part of the configuration process. Without the correct name, the storage controller will refuse the login request as unauthorized. Consequently, the iSCSI session will not be established. Note that the login name is protected by IPSec when it is transferred across the subnet from the host to the storage controller. After authentication, a secured connection is established between host 12 and the storage controller for substantive configuration messages.

Thus, in addition to the security provided by IKE and IPSec, the IP configuration and substantive configuration commands and responses are further protected by a proprietary configuration protocol whose content is cryptic and difficult to understand by devices that are not privy to it. A malicious application must know the proprietary protocol in order to send a damaging configuration command to the storage controller. Thus, in order for a malicious application on a host system to establish a secure session with a controller and be able to send damaging configuration commands, this application must know the proprietary protocols used for discovery, IP configuration, substantive configuration. The unfriendly host also needs to know the decryption algorithm and the IP address of the friendly host.

Based on the foregoing, systems and methods for authenticating hosts and other devices, and configuring storage controllers and other devices have been disclosed. However, numerous modifications and substitutions can be made without deviating from the present invention. For example, IKE and IPSec protocol can be replaced with a proprietary protocol that provides similar functions including key exchange, authentication and data protection. Therefore, the invention has been disclosed by way of illustration and not limitation, and reference should be made to the following claims to determine the scope of the present invention.

The invention claimed is:

1. A method for authenticating a host on a network to enable the host to update an Internet protocol (IP) configuration of a storage controller coupled to the network, said host including an algorithm to decrypt a security key supplied by the storage controller, said method comprising the steps of:

said host broadcasting a discovery command, said discovery command including an IP address of said host and a service requested by said host, said discovery command conforming to a proprietary discovery command protocol, wherein said discovery command protocol is not publicly known and is configured to authenticate said host to said storage controller;

said host receiving and understanding a response from said storage controller, said response conforming to said discovery command protocol, said storage controller able to provide the requested service, the response including a world wide name (WWN), IP configuration, and the security key of said storage controller;

said host decrypting said key from the storage controller using said decryption algorithm such that said decryption algorithm is selected from a Triple Data Encryption Standard algorithm and a MARS algorithm and authenticates said host to said storage controller, and wherein the authentication of said host for the purpose of enabling the host to update an IP configuration of a storage controller is based on its broadcast of said discovery command with said discovery command protocol, its understanding of said response with said discovery command protocol and its use of said decryption algorithm; and said host determining if said storage controller's IP configuration is valid, and sending to said storage controller a valid IP configuration, an internal configuration comprising a redundant array of independent disks (RAID) level configuration, and the security key to authenticate said host in response to said storage controller's IP configuration being invalid.

2. A method as set forth in claim 1 wherein said security key is generated by said storage controller dynamically or entered by administrator of said storage controller.

3. A method for authenticating a host on a network to enable the host to update an IP configuration and internal configuration of a storage controller connected to the network, said host including an algorithm to decrypt a security key supplied by the storage controller, said method comprising the following steps in order:

(a) said host broadcasting a discovery command, said discovery command including an IP address of said host and a service requested by said host, said discovery command conforming to a discovery command protocol, wherein said discovery command protocol is not publicly known and is configured to authenticate said host to said storage controller;

(b) said host receiving and understanding a response from said storage controller, said response conforming to said discovery command protocol, said storage controller able to provide the requested service, the response including a WWN, IP configuration, and a security key of said storage controller;

(c) said host decrypting said security key received from the storage controller using said decryption algorithm such that said decryption algorithm is selected from a Triple Data Encryption Standard algorithm and a MARS algorithm and authenticates said host to said storage controller;

(d) said host sending an updated IP configuration to said storage controller;

(e) said host exchanging other keys with said storage controller using Internet key exchange (IKE) and IP security (IPSec); and (f) said host sending an updated internal configuration comprising a RAID level configuration and the security key to authenticate said host to said storage controller.

4. A method as set forth in claim 3 wherein said host returns said security key to said storage controller before sending said updated IP configuration to said storage controller, said security key returned by said host authenticating said host to said storage controller.

5. A method as set forth in claim 3 wherein said discovery command protocol is proprietary, and the authentication of said host for the purpose of sending the updated IP configuration to said storage controller is also based on its broadcast of said discovery command with said proprietary discovery command protocol, its understanding of said response with said proprietary discovery command protocol and its use of said decryption algorithm.

6. A method as set forth in claim 3 wherein said storage controller did not have a valid IP configuration before step (d).

7. A method for a host to discover storage controllers on a network and update their IP configuration if invalid, said host including a decryption algorithm for a security key, said method comprising the following steps in order:
   (a) broadcasting a discovery command using a proprietary discovery command protocol, said discovery command including an IP address of said host and one or more services requested by said host, wherein said proprietary discovery command protocol is not publicly known and is configured to authenticate said host to said storage controller;
   (b) receiving responses from one or more storage controllers that understand said discovery command protocol and can provide the requested service(s), the response including a WWN, IP configuration and a security key of respective storage controller;
   (c) decrypting said security key received from the storage controller using said decryption algorithm such that said decryption algorithm is selected from a Triple Data Encryption Standard algorithm and a MARS algorithm and authenticates said host to said storage controller;
   (d) determining if said storage controller's IP configuration is valid; and
   (e) if said storage controller's IP configuration is invalid, sending to said storage controller a valid IP configuration, an internal configuration comprising a RAID level configuration, and said security key to authenticate said host.

8. A method as set forth in claim 7 wherein said security key is generated by said storage controller dynamically or entered by administrator of said storage controller.

9. A computer program product comprising a computer useable medium having a computer readable program, wherein the computer readable program when executed on a computer causes the computer to:
   broadcast a discovery command using a proprietary discovery command protocol, said discovery command including an IP address of a host and a service requested by said host, wherein said proprietary discovery command protocol is not publicly known and is configured to authenticate said host to said storage controller;
   receive responses from a storage controller that understands said discovery command protocol and can provide the requested service, the response including a WWN, IP configuration, and security key of respective storage controller;
   decrypt said security key received from the storage controller using said decryption algorithm such that said decryption algorithm is selected from a Triple Data Encryption Standard algorithm and a MARS algorithm and authenticates said host to said storage controller;
   determine if said storage controller's IP configuration is valid; and
   send to said storage controller a valid IP configuration, an internal configuration comprising a RAID level configuration, and said security key to authenticate said valid IP configuration in response to said storage controller's IP configuration being invalid.

10. The computer program product as set forth in claim 9 wherein the requested service is configured as an iSCSI service.

11. The computer program product as set forth in claim 9 wherein the requested service is configured as a FTP service.

12. The computer program product as set forth in claim 9 wherein the requested service is configured as a Telnet service.

13. A system to authenticate a host on a network, the system comprising:
   said host configured to broadcast a discovery command using a proprietary discovery command protocol over said network, said discovery command including an IP address of said host and a service requested by said host, wherein said proprietary discovery command protocol is not publicly known and is configured to authenticate said host to a storage controller;
   said storage controller configured to receive and authenticate said discovery command, and in response to authenticating the discover command and being able to provide the requested server, communicate a response to said host, wherein said response conforms to said proprietary discovery command protocol and includes a WWN, IP configuration, and security key;
   a RAID configured to redundantly store data;
   said host further configured to decrypt said security key from said storage controller using a decryption algorithm selected from a Triple Data Encryption Standard algorithm and a MARS algorithm, and authenticates said host to said storage controller, determine if said storage controller's IP configuration is valid, and send to said storage controller a valid IP configuration, an internal configuration comprising a RAID level configuration, and said security key to authenticate said host in response to said storage controller's IP configuration being invalid.

14. The system as set forth in claim 13 wherein said host is further configured to exchange other keys with said storage controller using IKE and IPSec.

15. The system as set forth in claim 14 wherein said host employs a Main Mode IKE exchange.

16. The system as set forth in claim 14 wherein said host employs an Aggressive Mode IKE exchange.

* * * * *